(No Model.)
P. GIRNAU.
LUMBER WAGON.
No. 505,519.  Patented Sept. 26, 1893.
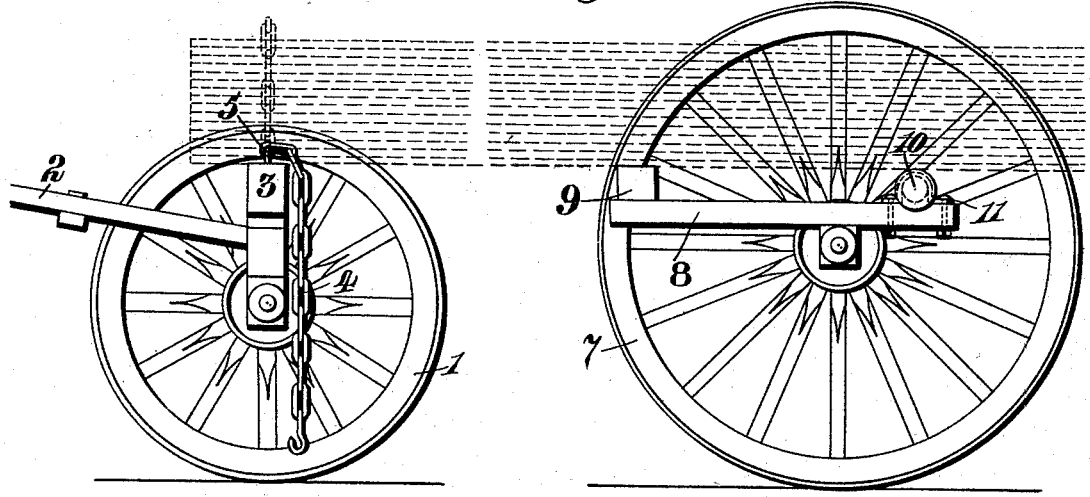
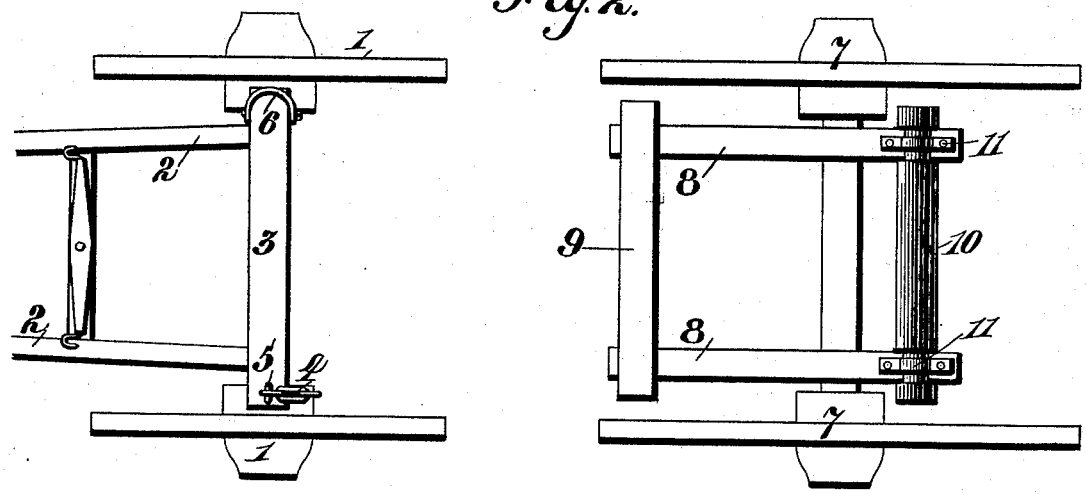
Witnesses:
H. G. Dieterich
B. W. Sommers
Inventor:
Peter Girnau

UNITED STATES PATENT OFFICE.

PETER GIRNAU, OF EAU CLAIRE, WISCONSIN.

LUMBER-WAGON.

SPECIFICATION forming part of Letters Patent No. 505,519, dated September 26, 1893.

Application filed January 28, 1893. Serial No. 459,932. (No model.)

*To all whom it may concern:*

Be it known that I, PETER GIRNAU, a citizen of the United States, residing at Eau Claire, in the county of Eau Claire and State of Wisconsin, have invented certain new and useful Improvements in Dumping Wagons or Trucks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention has relation to dumping wagons or trucks, and more especially to that class of wagons or trucks employed for hauling lumber.

The invention consists in the combination with the fore truck, of an independent hind truck provided with a platform or frame for the rear portion of the load, and with a rolling bearing in rear of the hind wheel axle, and in means for detachably connecting the two trucks, as will now be fully described, reference being had to the accompanying drawings, in which—

Figure 1 is a side elevation, and Fig. 2 a top plan view of a lumber dumping wagon embodying my invention.

The object of my invention is to provide means whereby a load of lumber may be readily dumped without materially disarranging the load, and to this end I provide two independent trucks, which in use are connected through the load thereon.

The fore truck comprises the usual low fore wheels, 1, 1, the shafts, 2, and a bolster, 3, or other suitable support for the fore end of the load, (said bolster or other support being as usual, pivotally connected with the fore axle tree) a rope or ropes, or a chain or chains, 4, being connected therewith in any usual or preferred manner for securing the load thereto. As shown, the bolster 3 has a chain staple, 5, at one end to which one end of the chain 4 is secured, and at its opposite end said bolster has a chain loop 6, pivoted thereto, through which the chain is drawn, the latter terminating in a hook to hook it to one of the chain links when drawn tight around the load. Any other means may, however, be provided to connect or tie the fore end of the load to the bolster, but whatever means are employed they should be of such a nature that the load can be readily and quickly disconnected from the bolster.

The hind truck consists of two hind wheels, 7, and a frame carried by the hind wheel axle tree, to which it is rigidly secured by bolts or otherwise. The frame consists of two side bars, 8, secured to the axle tree as close to the wheels as possible and parallel therewith. At their forward end the side bars 8 are connected by a cross bar 9, bolted to the upper face of said side bars said cross bar lying about two feet, more or less in front of the axle tree. On the rear end of the side bars in rear of the axle tree is secured a roller, 10, so as to revolve freely in its bearings, which are formed by straps, 11, connected to the side bars 8, the roller having a peripheral groove at each end of a depth equal to or slightly greater than the thickness of the said straps, 11, so that the load on the frame will be supported exclusively or substantially so by the said roller, 10. The thickness of the roller is such as not to project above the upper face of the front cross bar, 9, and the periphery of said roller lies about six inches in rear of the axle tree of the rear truck.

In loading, the forward end of the frame is supported by a trestle, and after the loading is completed the fore truck is run under the front end of the load so that it will rest on the bolster, 3, to which it is secured by the chain, 4, and as the load is started the trestle will be tripped from under the supporting frame. In unloading, the load is first disconnected from the bolster, 3, the hind wheels are blocked to prevent the rear truck from moving with the fore truck, and the latter is then drawn from under the load, thereby tripping the supporting frame, and as the rear end of the load rests upon a rolling bearing the pressure exerted thereby forces the hind truck rearwardly from under the load, which is dropped to the ground without materially disarranging it, as the lower layer of the said load has bearing on the supporting frame and its rolling bearing until the latter has moved completely from under the load with the rear truck.

I am aware that rolling bearings have heretofore been used on lumber and other trucks to facilitate the loading and unloading, and I am also aware that such rolling bearings have been used at opposite ends of two-wheeled hand trucks for the purpose of facilitating the dumping of the load. This is, however not readily effected unless some means are provided to impel the load, as a spiked roller, for instance, arranged midway between the rolling bearings, and practice has shown that even these devices do not effectually drive the truck from under the load, by reason of the length of the frame which bears on the ground with the load, which is not the case in the truck which forms the subject matter of this invention and in which that portion of the frame which projects forwardly of the axle tree is somewhat shorter than the truck wheel radius.

By making the fore and hind trucks separate and by using a comparatively short supporting frame for the rear end of the load, and by locating the rolling bearing in rear of the axle tree of the rear truck but in close proximity thereto, the desired results aimed at are attained.

Having thus described my invention, what I claim as new therein, and desire to secure by Letters Patent, is—

1. A dumping lumber wagon comprising disconnected two-wheeled fore and hind trucks, said fore truck provided with a suitable bolster for the fore end of the load and said hind truck provided with a supporting frame for the rear end of the load, said frame having a rolling bearing for the load at its rear end in rear of but proximate to the wheel axle, for the purpose set forth.

2. A dumping lumber wagon comprising disconnected two wheeled fore and hind trucks, said fore truck provided with a suitable bolster for the fore end of the load, and said hind truck provided with a supporting frame secured to its wheel axle and projecting forwardly and rearwardly thereof, the portion in front of the axle tree being shorter than the wheel radius, and a rolling bearing for the load at the rear end of said frame, for the purpose set forth.

3. A dumping lumber wagon comprising disconnected fore and hind trucks, said fore truck provided with a bolster for the fore end of the load and with means for securing said load thereto, said hind truck provided with a supporting frame secured to and projecting forwardly and rearwardly of its wheel axle, the portion of said frame in front of the axle tree being shorter than the wheel radius, and a rolling bearing at the rear end of the frame in close proximity to the axle tree, for the purpose set forth.

In testimony whereof I have hereto signed my name in the presence of two witnesses.

PETER GIRNAU.

Witnesses:
J. F. ELLIS,
MARTHA SCHWAHN.